3,691,080
NITRITES IN VINYL CHLORIDE POLYMERIZATION

Johann Bauer, Kurt Fendel, and Thomas Balwe, Burghausen, Upper Bavaria, Germany, assignors to Wacker-Chemie G.m.b.H., Munich, Germany
No Drawing. Filed Sept. 22, 1970, Ser. No. 74,468
Claims priority, application Germany, Sept. 24, 1969, P 19 48 358.0
Int. Cl. C08f 1/58
U.S. Cl. 260—78.5 CL          6 Claims

ABSTRACT OF THE DISCLOSURE

Process for polymerizing vinyl chloride, and for copolymerizing vinyl chloride with up to 50% by weight of other ethylenic unsaturated monomers, in aqueous phase containing a suspension agent, in the presence of an oil-soluble catalyst, which comprises heating the suspension to a temperature of 30 to 80° C. at a pressure of 1 to 15 atmospheres in the presence of 0.0001 to 0.1% by weight, referred to monomers, of inorganic or organic nitrites.

---

When suspension polyvinyl chloride is made, vinyl chloride and perhaps other ethylenic unsaturated monomers are suspended in water by vigorous stirring. In this way small droplets are created which with the aid of catalysts are converted into solid polymer particles during polymerization. The presence of water-soluble protective colloids is necessary here. They on the one hand help the dispersion of the monomer phase into separate droplets, and on the other hand they prevent the monomer droplets or the already partly polymerized monomer droplets from flowing together or adhering to each other.

The polymer particles created there are generally round. Their surface is either ideally smooth or more or less uneven. Therefore these particles deposit themselves as a powdery product more or less closely together and they then have an apparent density, which is also called pour weight. This apparent density can vary within wide limits.

For the thermoplastic processing of polyvinyl chloride the pour weight is an important factor. The higher it is, the better is the product's space utilization. Thus processing containers, like mixers, can be loaded with a larger product quantity with the same volume. At the same time this makes possible a greater supply to processing machines such as extruders and plasticizers, thus increasing the output per unit of time.

It is customary to determine for loose materials, like polyvinyl chloride, the so-called shaking weight besides the pour weight, this being measurable exactly and reproducibly. Therefore the shaking weight will always be given below. The latter differs from the pour weight in that not the weight of one liter of loosely poured product is given, but the weight of one liter of the product that has been shaken in accordance with certain rules. 100 g. of the product are loaded into a measuring cylinder and shaken by 1000 impacts in a tamping volume meter (firm of Engelsmann, Ludwigshafen (Rhine), Germany). After that the volume is read off and computed to grams per liter.

The shaking weight of polyvinyl chloride or its copolymers can be increased by known methods. In these methods special protective colloid mixtures are used, or modifying agents are used. However, for this quantities of 0.5 to 2% by weight are necessary. This means a considerable adulteration of the polyvinyl chloride and thus a deterioration of the quality of the product.

We have discovered a process for polymerizing vinyl chloride, or copolymerizing vinyl chloride with up to 50% by weight of ethylenic unsaturated monomers in aqueous phase in the presence of oil-soluble catalysts, suspension agents as well as perhaps buffer substances and/or molecular weight regulators and/or smaller quantities of emulsifiers. Our process is characterized by the fact that one works at a temperature of 30 to 80° C., a pressure of 1 to 15 atmospheres and in the presence of 0.0001 to 0.1% by weight, preferably 0.0003 to 0.03% by weight, referred to the monomers, of organic and/or inorganic nitrites.

When carrying out the process, the nitrite is inserted in the polymerization reactor together with the protective colloids, catalysts and other additives. The sequence of the feeding is of no importance. It is useful to dissolve or suspend the nitrite in water after it has been loaded into the reactor.

The most desirable inorganic nitrites are alkali nitrites, particularly sodium nitrite, but also lithium and potassium nitrites. Basically the cation plays only a subordinate part. Good results can be obtained, for instance, with alkaline earth nitrites or with ammonium nitrite. One can also use the organic esters of nitrous acid, like ethyl nitrite or amyl nitrite. Mixtures of individual nitrites with each other can likewise be used.

With the additive of nitrite according to our invention, the shaking weights of the polymers are increased by 10 to 80% compared to the shaking weights that can be achieved by the customary processes, without incurring any deterioration of the product by impurities.

The polymerization is carried out in closed vessels in aqueous phase, and generally the polymerization is under the autogenous pressure of the monomers. However, an increased pressure of up to 15 atmospheres can also be used. The reaction vessel contains a stirring device and most of the time baffles or deflecting ribs to guarantee an intensive stirring effect. As a rule jacketed autoclaves are used, which guarantees an intensive cooling effect.

The monomer/water proportion is of no decisive significance. As a rule the percentage of monomers is 10 to 60% by weight of the total quantity of water and monomers.

All the monomer-soluble polymerization catalysts that can be used for the suspension polymerization of vinyl chloride can be used also in our process. Here are some examples of such catalysts: diaryl-, diacyl peroxides like diacetyl-, acetylbenzoyl-, dilauryl-, dibenzoyl-, bis-2,4-dichlorobenzoyl peroxide; dialkyl peroxides, like ditertiary butyl peroxide; peresters like tertairy-propylperacetate, tertiary-butylperacetate, tertiary-butylperoctoate, tertiary-butylperpivalate; dialkylperoxidicarbonates like diisopropyl-, diethylhexyl-, dicyclohexyl-, dialkylcyclohexyl-peroxidicarbonate; mixed anhydrides of organic sulfo-peracids and organic acids, like acetylcyclohexyl sulfonyl peroxide, as well as azo compounds known as polymerization catalysts like azoisobutyric acid dinitrile and boron alkyls. The catalysts can be used separately or in mixture. The quantities generally are 0.001 to 3 weight percent, preferably 0.01 to 0.3% by weight, referred to monomers. The catalysts may be placed in together with the polymers and they may also be fed in during polymerization.

The suspension agents are added in quantities of 0.03 to 1% by weight, referred to the water percentage, for instance polyvinyl alcohol, which may still contain up to 40% acetyl groups, cellulose derivatives, like methyl cellulose, carboxymethyl cellulose, hydroxyethyl cellulose, hydroxypropyl cellulose, methylhydroxypropyl cellulose, as well as copolymerizates of maleic acid or its semi-esters with styrol. Also, in addition one can use small quantities of anionic, cationic, amphoteric or not ionic emulsifiers.

Also one can add to the polymerization starter customary auxiliary substances, e.g. buffer substances like sodium bicarbonate, soda, calcium carbonate, alkali acetates, alkali phosphates or molecular weight regulators, like for instance aliphatic aldehydes with 2 to 4 carbon atoms, chlorinated hydrocarbons, like di- and trichloroethylene, chloroform, methylene chloride and mercaptanes.

The process of the invention can also be used for the copolymerization of vinyl chloride with other ethylenic unsaturated compounds with a percentage up to 50% by weight, preferably 30% by weight. As such all compounds are suitable which can be radically polymerized with vinyl chloride; particular mention should be made of vinylidene chloride, vinyl fluoride, vinylidene fluoride, vinyl esters of straight-chained or branched carboxylic acids with 2–20 carbon atoms, like vinyl acetate, vinyl propionate, vinyl butyrate, vinyl-2-ethylhexoate, vinylvarsatic acid ester, vinylisotridecanoic acid ester, vinyl ether, unsaturated acids, like maleic, fumaric, itaconic, crotonic, acrylic, methacrylic acid and their mono- or diesters with mono- or dialcohols with 1 to 10 carbon atoms; also olefines, like ethylene, propylene, isobutylene; styrol; acrylonitrile. The monomers may be placed in at the start or they may be fed in continuously.

The percentages and parts shown in the examples are weight data.

EXAMPLE 1

A pressure-tight stirring vessel equipped wih an impeller stirrer and a stream impeder is filled with:

| | Parts |
|---|---|
| Fully desalted water | 1000 |
| Methylhydroxypropyl cellulose (Methocel 90 HG, 100 cp) | 0.93 |
| Sodium bicarbonate | 0.2 |
| Acetylcyclohexane sulfonylperoxide | 0.1 |
| Tertairy butylperpivalate | 0.077 |

After this the vessel is evacuated for 30 minutes and supplied with 620 parts vinyl chloride.

Polymerization takes place at a stirrer speed of 150 r.p.m. and a temperature of 54° C. until a conversion of 82% is reached.

The product is very fine grained (32% finer than 0.06 mm., 99% finer than 0.1 mm). The shaking weight is 520 g./liter.

EXAMPLE 1a

One proceeds in the same manner as in Example 1 with the exception that 0.031 part sodium nitrite (0.005% referred to vinyl chloride) is added to the starting substances.

The product obtained after an 83% conversion is very fine grained (29% is finer than 0.06 mm., 100% is finer than 0.1 mm.). The shaking weight is 610 g./liter.

EXAMPLE 2

A stirring vessel as described in Example 1 is filled with:

| | Parts |
|---|---|
| Fully desalted water | 1000 |
| Hydroxyethyl cellulose (Cellosize WP 4400) | 0.93 |
| Sodium bicarbonate | 0.1 |
| Acetylcyclohexane sulfonylperoxide | 0.1 |
| Tertiary butylperpivalate | 0.077 |

After this the vessel is evacuated for 30 minutes and fed with 620 parts vinyl chloride.

Polymerization occurred at the speed of rotation of 150 r.p.m. and at a temperature of 54° C. with a conversion of 83%.

The product has the sifted analysis:

| | Percent |
|---|---|
| 0.15 mm. | 5 |
| 0.10 mm. | 59 |
| 0.075 mm. | 19 |
| 0.06 mm. | 11 |
| 0.04 mm. | 4 |
| 0.04 mm. | 2 |

The shaking weight is 580 g./liter.

EXAMPLE 2a

The same procedure is followed as in Example 2 with the exception that 0.031 part sodium nitrite (0.005% referred to vinyl chloride) is added to the starting substances.

The product obtained after a conversion of 84% has the following sifted analysis:

| | Percent |
|---|---|
| 0.15 mm. | 11 |
| 0.10 mm. | 59 |
| 0.075 mm. | 16 |
| 0.06 mm. | 8 |
| 0.04 mm. | 4 |
| 0.04 mm. | 2 |

The shaking weight is 690 g./liter.

EXAMPLE 3

A pressure-proof mixing vessel with a volume of 430 liters, equipped with an impeller stirrer and a stream impeder, is filled with:

| | Parts |
|---|---|
| Fully desalted water | 1000 |
| Hydroxyethyl cellulose (Cellosize WP 4400) | 1.5 |
| Tertiary butylperpivalate | 0.35 |

Thereafter the vessel is evacuated for 45 minutes and fed with 5 parts trichloroethylene
75 parts vinyl acetate, and
425 parts vinyl chloride.

The polymerization is carried out at a stirrer speed of 140 r.p.m. and at a temperature of 64° C. until a conversion of about 90% is reached.

The product is fine (99% finer than 0.3 mm.). The shake weight is 590 g./liter.

EXAMPLE 3a

The same procedure is followed as in Example 3 with the exception that 0.005 part sodium nitrite (0.001% referred to the total of vinyl chloride and vinyl acetate) is added to the starting substances. The product obtained after a conversion of about 90% is fine (97% finer than 0.3 mm.). The shake weight is 850 g./liter.

EXAMPLE 4

A mixing vessel as described in Example 3 is filled with:

| | Parts |
|---|---|
| Fully desalted water | 1000 |
| Hydroxyethyl cellulose (Cellosize WP 4400) | 1.5 |
| Isopropylperoxide dicarbonate | 0.15 |

Thereafter the vessel is evacuated for 45 minutes and fed with 5 parts trichloroethylene
75 parts vinyl acetate, and
425 parts vinyl chloride.

Polymerization is carried out at a stirrer speed of 140 r.p.m. and at a temperature of 64° C. until a conversion of about 90% is reached. The product is fine (100% finer than 0.3 mm.). The shaking weight is 620 g./liter.

EXAMPLE 4a

The same procedure is followed as in Example 4 with the exception that 0.03 part potassium nitrite (0.005% referred to the total quantity of vinyl chloride and vinyl acetate) is added to the starting substances. The product obtained after a conversion of about 90% is fine (98% finer than 0.3 mm.). The shaking weight is 710 g./liter.

EXAMPLE 5

A mixing vessel as in Example 3 is filled with:

| | Parts |
|---|---|
| Fully desalted water | 1000 |
| Hydroxyethyl cellulose (Cellosize 4400) | 1.5 |
| Isobutylcyclohexyl peroxydicarbonate | 0.4 |

Thereafter the vessel is evacuated for 45 minutes and fed with 5 parts trichloroethylene
75 parts vinyl acetate, and
425 parts vinyl chloride.

Polymerization occurs at a stirrer speed of 140 r.p.m. and at a temperature of 64° C. until a conversion of about 90% is reached. The product is relatively fine (81% finer than 0.3 mm.) and has a shaking weight of 680 g./liter.

EXAMPLE 5a

The same procedure is followed as in Example 5, with the exception that 0.005 part sodium nitrite (0.001% referred to the total of vinyl chloride and vinyl acetate) is added to the starting substances.

The product obtained after a conversion of about 90% is relatively fine (86% finer than 0.3 mm.) and has a shake weight of 870 g./liter.

EXAMPLE 6

This example illustrates the increase of the shaking weight as the additional quantities of sodium nitrite increase.

A pressure-tight pipe of stainless steel with a volume of 2 liters is filled with:

| | G. |
|---|---|
| Fully desalted water | 750 |
| Hydroxyethyl cellulose (Cellosize 4400) | 1.5 |
| Isopropylperoxydicarbonate | 0.25 |
| Vinyl acetate | 55 |

Thereupon the pipe is evacuated up to the full vacuum and fed with 320 g. vinyl chloride.

The pipe is then tumbled end over end for 22 hours in a water bath at 64° C. After this period a conversion of about 90% is obtained. The product has a shaking weight of 460 g./liter.

By adding increasing quantities of sodium nitrite the following shaking weights are obtained:

| Sodium nitrite (percent by weight on monomers) | Shaking weight (g./liter) |
|---|---|
| 0.0 | 460 |
| 0.0001 | 580 |
| 0.0003 | 640 |
| 0.001 | 760 |
| 0.003 | 670 |
| 0.01 | 810 |
| 0.03 | 850 |

The invention claimed is:

1. Process for polymerizing vinyl chloride, and for copolymerizing vinyl chloride with up to 50% by weight of total monomers of monoethylenically unsaturated monomers selected from the group consisting of vinyl esters of straight-chained or branched aliphatic acids with 2–20 carbon atoms; unsaturated mono- or di-carboxylic acids and their mono- and di-esters with mono- and di-alcohols with 1–10 carbon atoms; olefins; styrol; and acrylonitrile, in aqueous phase containing a suspension agent, in the presence of an oil-soluble catalyst which comprises heating the suspension to a temperature of 30–80° C. at a pressure of 1–15 amtospheres in the presence of 0.0001 to 0.1% by weight referred to the monomers of an inorganic nitrite.

2. Process according to claim 1, which is performed in the presence of an alkali nitrite.

3. Process according to claim 1, which is performed in the presence of sodium nitrite.

4. Process according to claim 1, in which the catalyst is employed in a quantity of 0.01 to 0.3% by weight, referred to monomers.

5. Process according to claim 1, in which the suspension agent is used in quantities of 0.03 to 1% by weight, referred to the water percentage.

6. Process according to claim 1, in which the percentage of monomers in the aqueous phase amounts to between 10 and 60% by weight of the total quantity of water and monomers.

References Cited

UNITED STATES PATENTS 3,418,300  12/1968  Nakajima et al. _____ 260—85.5

JOSEPH L. SCHOFER, Primary Examiner

S. M. LEVIN, Assistant Examiner

U.S. Cl. X.R.

260—78.5 R, 85.5 X, 87.1, 87.5 R, 87.5 A, 87.5 C, 87.5 G, 87.7, 92.8 W